US012754882B1

(12) United States Patent
Avery et al.

(10) Patent No.: US 12,754,882 B1
(45) Date of Patent: Oct. 6, 2026

(54) TECHNIQUES FOR EXFILTRATION TELEMETRY

(71) Applicant: Zach Shawn Avery, Lowell, IN (US)

(72) Inventors: Zach Shawn Avery, Lowell, IN (US); William Christopher Bonk, Countryside, IL (US); Jacob Edward Bonk, Countryside, IL (US); William James Hupp, Lakewood, CO (US)

(73) Assignee: Kiken Technologies, LLC, Lowell, IN (US)

( * ) Notice: Subject to any disclaimer, the term of this patent is extended or adjusted under 35 U.S.C. 154(b) by 0 days.

(21) Appl. No.: 19/360,924

(22) Filed: Oct. 16, 2025

(51) Int. Cl.
*G06F 16/17* (2019.01)
*G06F 16/182* (2019.01)
*G06F 21/62* (2013.01)

(52) U.S. Cl.
CPC ........ *G06F 16/1734* (2019.01); *G06F 16/183* (2019.01); *G06F 21/6218* (2013.01)

(58) Field of Classification Search
CPC . G06F 16/1734; G06F 16/183; G06F 21/6218
See application file for complete search history.

(56) References Cited

U.S. PATENT DOCUMENTS 9,747,455 B1 * 8/2017 McClintock ........ H04L 63/1441
2023/0129705 A1 * 4/2023 Wiklof ................ G06F 21/6245 726/26

OTHER PUBLICATIONS

Cyberhaven, "Reimagined Data Loss Prevention and Insider Threat Protection" (online technical documentation), available at https://cdn.prod.website-files.com/64deefeac57fbbefc32df53d/68d3a8fa108af37c7c3e2d9a_DS_Cyberhaven%20Platform%20(1).pdf, accessed Sep. 2025, Online.
Thinkst Canary, "Canary Overview" (online technical documentation), available at https://resources.canary.tools/documents/canary-1-pager.pdf, accessed Sep. 2025, Online.
pii-tools.com (or author name if known), "PII Tools Documentation" (online technical documentation), available at https://documentation.pii-tools.com/, accessed Sep. 2025, Online.

* cited by examiner

*Primary Examiner* — Nazia Naoreen

(57) ABSTRACT

Generating tracer payloads, integrating the tracer payloads into digital files, and collecting telemetry when the files are accessed on foreign computing environments. A computing device generates a tracer payload including an identifier corresponding to a file and embedded content structured for interpretation by standard file-handling behavior. The computing device integrates the tracer payload into the file to produce a tracer payload-integrated file that, when accessed on a foreign computing environment, automatically causes the foreign computing environment to perform a telemetry operation. The telemetry operation includes generating a network communication containing the identifier and network-pathway attributes associated with the foreign computing environment. A telemetry management service receives the network communication, determines that an exfiltration of the file has occurred, and initiates a responsive action in accordance with enterprise policy.

20 Claims, 11 Drawing Sheets

TECHNIQUES FOR EXFILTRATION TELEMETRY

BACKGROUND

Digital files routinely move across organizational and network boundaries, whether through legitimate collaboration, accidental misrouting, or malicious exfiltration. Once a file leaves an enterprise's controlled environment, visibility into where that file travels and how it is later handled is largely lost.

Conventional data-loss-prevention systems operate within managed networks or rely on endpoint agents that monitor file activity. These agents can track file movement only while the file remains on a monitored device. When a copy of the file is removed from the managed domain (e.g., sent through personal email, uploaded to a third-party platform, or copied onto an unmanaged endpoint), traditional monitoring ends. The originating enterprise cannot observe whether the file was later opened, viewed, or transmitted elsewhere.

Some file-tracking and alerting tools attempt to extend visibility by embedding a single beacon, macro, or hyperlink into a file. When the file is opened in a compatible application, that element may trigger a network request back to a monitoring server. These approaches, however, depend on active cooperation from the foreign computing environment: the viewer must support and execute the particular embedded code or link type, the user must permit such behavior, and network conditions must allow the request. In many environments, macros are disabled, previews are sandboxed, and external references are blocked, leaving the beacon inert. Even when they function, such mechanisms typically provide only a minimal signal that a file was opened, without any detail about where it was opened or how the network path was established.

Other techniques, such as watermarking or embedded identifiers, offer only forensic identification after a leaked file is recovered. They do not produce live telemetry or reveal intermediate distribution pathways. Network-inspection tools, while useful for detecting exfiltration events, operate only at transmission time and cannot reconstruct what happens to a file afterward.

The result is a persistent blind spot: enterprises can detect that a file left the perimeter but struggle to determine where it went, who accessed it, or through which networks it propagated. When sensitive information is exfiltrated, whether through insider misuse or an external intrusion, organizations often regain operational control without ever learning the scope, volume, and value of data that was exposed. This uncertainty increases recovery time, compliance cost, and reputational risk.

SUMMARY

The techniques disclosed herein relate to systems and methods for tracking the movement and use of digital files after those files leave a managed computing environment. In some examples, a computing device providing an exfiltration telemetry system generates a tracer payload that includes multiple types of embedded content. The tracer payload is integrated into a target file such that, when the file is later accessed on a foreign computing environment, ordinary file-handling operations of that environment automatically process one or more of the embedded-content elements. Processing the embedded content causes the foreign computing environment to generate a network communication containing a tracer identifier and network-pathway information.

The network communication is received by a telemetry collector of the exfiltration telemetry system that records and correlates telemetry events to reconstruct the lifetime of the file. Because the tracer payload is interpretable through standard file-handling behavior, no specialized monitoring component or cooperative software is required on the foreign computing environment. In some embodiments, the tracer payloads may be created, deployed, or managed by an enterprise-side telemetry service operating within the originating network.

This Summary introduces a selection of concepts in a simplified form that are further described below. It may be understood that this Summary is not intended to identify key features or essential features of the claimed subject matter, nor is it intended to be used to limit the scope of the claimed subject matter.

BRIEF DESCRIPTIONS OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
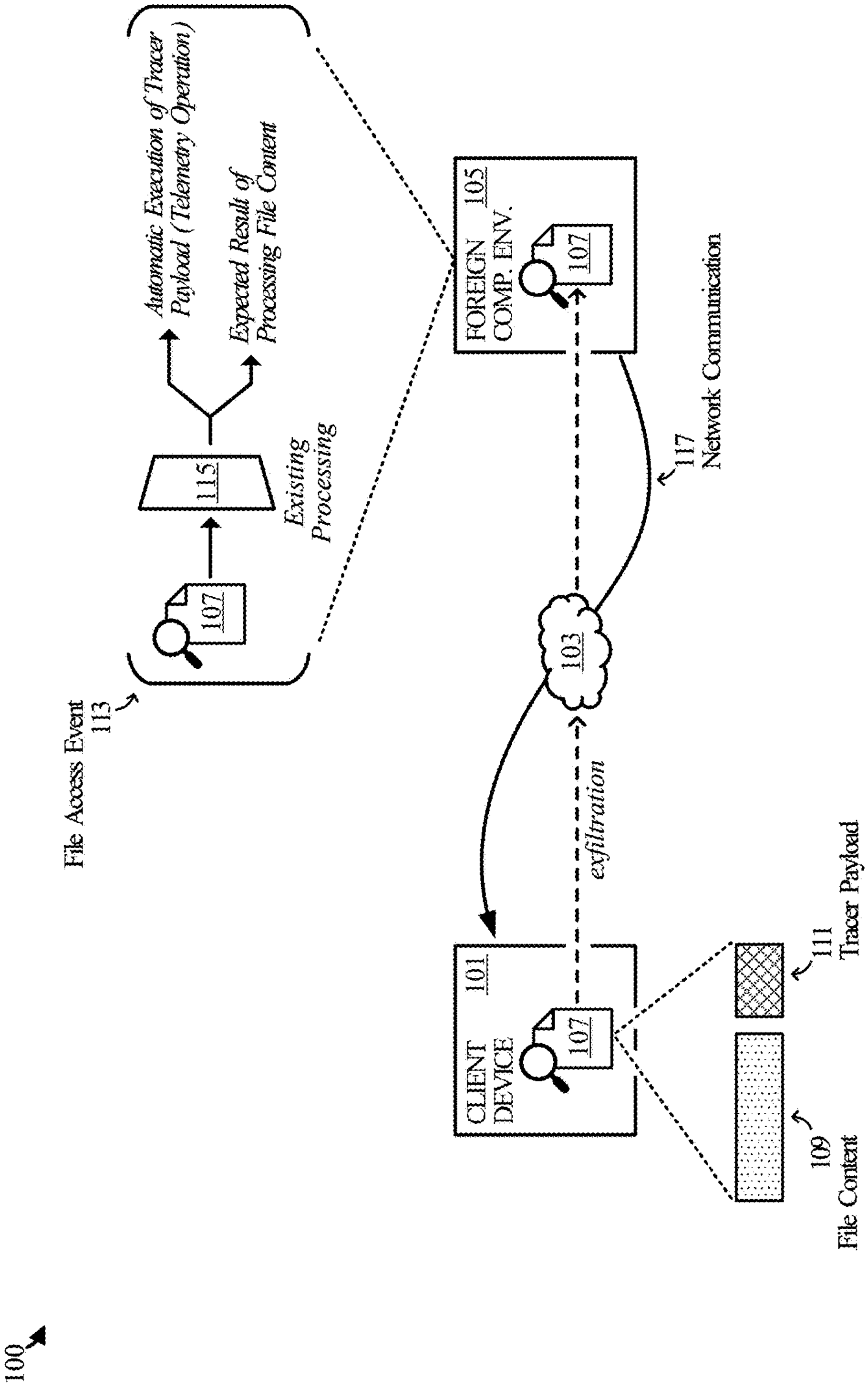
FIG. 1 illustrates an operational environment in accordance with an implementation.

The methods, systems, and apparatus disclosed herein provide techniques for providing an exfiltration telemetry system that tracks the movement and use of digital files after those files leave a managed computing environment. In some embodiments, a computing environment includes one or more computing devices configured to generate and manage tracer payloads for association with digital files. Each tracer payload may include a tracer identifier corresponding to a particular file and embedded content that is interpretable by common file-handling systems. A tracer payload may be integrated into a file to produce a tracer payload-integrated file, which may subsequently be stored, distributed, or otherwise made available for access by a foreign computing environment that is not under the administrative control of the originating enterprise.

In some embodiments, the one or more computing devices may execute program instructions that generate a tracer payload in accordance with a defined policy. The policy may specify parameters such as the tracer identifier format, telemetry collector address, time-to-live, or the embedded-content variants to be included. In some embodiments, the one or more computing devices generate and deploy tracer payloads in accordance with policies that define which types of files or data should be automatically integrated with a tracer payload. For example, a particular file may be scanned in order to detect the presence of personal information or other types of sensitive data, in response to which a tracer payload can be automatically generated and deployed.

The tracer payload may include multiple forms of embedded content, each designed to be interpretable by different file-handling processes. Examples of embedded-content variants include markup directives, linked-object definitions, metadata fields, script segments, or encoded network references. These variants may be generated and combined into a single payload such that the resulting tracer payload includes all supported content types simultaneously. This configuration increases the likelihood that at least one variant will be processed when the tracer payload-integrated file is later handled by a foreign computing environment.

In some embodiments, a payload-integration process modifies data associated with a target file to incorporate the tracer payload. The integration may involve inserting the embedded content into existing structural portions of the file, such as content sections, metadata regions, or container relationships. For example, a markup directive or linked-object definition may be added within a document body, a metadata field may be added within an Extreme Memory Profile (XMP) or exchangeable image file (EXIF) block, and an encoded network reference may be inserted in a relationship or hyperlink definition. In some cases, the integration may also include the addition of integrity data, cryptographic bindings, or checksums that verify that the tracer payload-integrated file has not been altered since integration. The integration may occur automatically in connection with file export, upload, file scan, or distribution processes managed by the originating host, service, enterprise, or other entity.

Once the tracer payload-integrated file has been generated and stored, it may later be distributed through ordinary file-sharing channels or removed from the managed environment through exfiltration. At any subsequent point, when a file access event is performed on the tracer payload-integrated file by a foreign computing environment, such as when the file is opened, previewed, indexed, or otherwise processed, the embedded content may be exposed to the normal file-handling behavior of that environment. The embedded content is structured such that ordinary operations performed by file viewers, preview services, metadata parsers, or indexing modules of the foreign computing environment will interpret one or more of the embedded-content elements without requiring any specialized software, plug-in, or agent.

In some embodiments, when the embedded content is processed during the file access event, it causes the foreign computing environment to automatically perform a telemetry operation. The telemetry operation may include generating a network communication from the foreign computing environment to the one or more computing devices. In some scenarios, a single host computing device generates tracer payloads, integrates the tracer payloads into files, and receives network communications relating to exfiltration of those files. In some other scenarios, a given computing device may generate and integrate tracer payloads into files, while another computing device acts as the end-point for the network communications.

The network communication may include the tracer identifier and one or more network-pathway attributes associated with the communication, such as a source address, resolver identifier, user-agent string, or transmission timestamp. The telemetry collector may receive the network communication and record telemetry data corresponding to the tracer payload-integrated file. Because the foreign computing environment performs the telemetry operation through its existing file-handling routines, no configuration or cooperation is required from the environment beyond its normal operation.

In some embodiments, a telemetry collector may include one or more computing devices configured to receive and process network communications produced by foreign computing environments. The telemetry collector may parse incoming communications to extract tracer identifiers and pathway attributes and may record these attributes in a telemetry database. A correlation or analytics service may then associate multiple telemetry events that share a common tracer identifier to reconstruct a lifetime or propagation pathway of the tracer payload-integrated file. In some examples, this analysis may indicate when and where the file has been accessed, the sequence of environments through which it propagated, whether multiple instances of exfiltration of the same file have occurred, or a combination thereof.

In some embodiments, a responsive action may be performed after determining that an exfiltration event has occurred. The responsive action may include one or more of policy enforcement, access restriction, network intervention, analytical correlation, containment, or remediation. In some scenarios, the responsive action is an audit of existing telemetry communication in order to detect patterns. For example, the system may generate an alert to an administrative dashboard, restrict further distribution of files associated with the tracer identifier, or initiate automated workflows to isolate affected systems or update security policies.

Alternative implementations of the techniques described may vary according to deployment and enterprise requirements. In some embodiments, the generation and integration of tracer payloads may be performed by a local computing device or enterprise gateway, while telemetry collection may be performed by a cloud-based service. In other embodiments, the payload generator and telemetry collector may be implemented within a unified telemetry management system operating on-premises, remotely (e.g., as a cloud service), or in a hybrid configuration. In still other embodiments, tracer payload integration may occur automatically within a content management system, file-sharing gateway, or email service that applies tracer payloads to outbound files in accordance with enterprise data-protection policies.

In some embodiments, a tracer payload service may be deployed across an enterprise network in association with multiple client computing devices. The service may include a central management component and one or more local software agents or modules installed on enterprise-managed client devices. Each local agent may be configured to monitor files created or modified on its corresponding client device, generate tracer payloads for those files in accordance with centrally defined policies, and integrate the tracer payloads to produce tracer payload-integrated files. The local agents may operate autonomously but communicate policy updates and telemetry data to the central management component. Network communications generated in connection with tracer payloads deployed by any of the local agents may be routed or replicated to a centralized telemetry collector or analytics engine, which aggregates and correlates telemetry from all participating devices to provide organization-wide visibility into file movement and exfiltration activity.

In some embodiments, the system may include cryptographic or policy-based controls that regulate which entities are authorized to interpret or collect telemetry data. The tracer payload may include encrypted identifiers, tokens, or authentication data that prevent unauthorized telemetry collection. Policy settings may also define retention periods or anonymization rules for stored telemetry data to ensure compliance with privacy and data-governance requirements.

The techniques for providing an exfiltration telemetry system as described herein provide several technical effects and operational advantages over conventional file-tracking and data-loss-prevention systems. In particular, the described system enables visibility into file activity after exfiltration without dependence on software installed in foreign environments, improves execution reliability through the use of multi-variant embedded content, generates telemetry based on the network communication that includes network-pathway information and foreign computing environment information for reconstructing file lifetimes, enhances enterprise security posture through correlated analytics and automated response, and reduces deployment and management complexity for large-scale data-protection systems.

The first technical effect arises from the ability to produce telemetry after a file has left a managed network or endpoint. Conventional monitoring systems lose visibility once a file is copied, shared externally, or opened on a device lacking monitoring software. In contrast, the disclosed system embeds content within the file that is interpreted during normal file-handling operations of a foreign computing environment. Because no plug-in, macro, or agent must be installed on the foreign system, telemetry can be produced when the file is opened, previewed, or indexed in unmanaged environments such as cloud-based collaboration platforms (e.g., MICROSOFT 365®), external endpoints (e.g., unmanaged client devices), online file hosting services (e.g., DROPBOX®), or a combination thereof. This enables the originating enterprise to maintain awareness of how and where the file is accessed even after administrative control has been lost.

A second technical effect is improved reliability in telemetry generation through the use of multiple embedded-content variants. Traditional document beacons depend on a single element, such as a macro or hyperlink, that must be executed under specific conditions. Such elements often fail to activate because scripting and external reference execution are disabled by default in modern applications. The tracer payload described herein, however, includes multiple content types (e.g., markup directives, relationship definitions, metadata fields, script segments, and encoded network references) inserted simultaneously into the file. At least one of these variants will typically be interpretable by the foreign computing environment, regardless of file type or viewer configuration. As a result, the likelihood of automatic telemetry generation is significantly increased without requiring user input or explicit cooperation.

The third technical effect concerns the richness of the telemetry itself. When the foreign computing environment processes the embedded content, it produces network communications that include not only a tracer identifier, but also host computing device information, such has host identification information, and network-pathway attributes, such as source addresses, resolver identifiers, protocol information, and timing data. These attributes allow a telemetry collector to identify the foreign computing device and to reconstruct the lifetime and propagation path of a tracer payload-integrated file. For instance, telemetry may indicate that a file was first opened on a particular remote endpoint, later scanned by a cloud indexing service, and subsequently transmitted to a secondary network. This information enables investigators to trace the journey of the file across multiple systems or environments (e.g., cloud-based collaboration platforms, external endpoints, or online file hosting services) and to understand the scope of data exposure in a way that conventional single-beacon techniques cannot achieve.

A fourth technical effect results from the ability to correlate telemetry from many tracer payload-integrated files and derive actionable intelligence. Telemetry events collected from multiple sources can be associated by tracer identifier, network-pathway similarity, or temporal correlation to detect coordinated exfiltration activity. The correlation process may automatically generate alerts, enforce enterprise policies, or initiate workflows for containment and remediation. This capability enhances incident response by enabling faster detection of data-loss events and reducing the time required to understand and mitigate their impact.

A fifth technical effect relates to deployment scalability and operational efficiency. Because tracer payload integration can occur through a central service or through lightweight enterprise agents deployed on managed endpoints, organizations can extend visibility across thousands of devices without altering end-user workflows or relying on external endpoint instrumentation. Each local component may autonomously generate and integrate tracer payloads for newly created files while forwarding telemetry to a centralized collector for aggregation and analysis. This architecture simplifies deployment, minimizes configuration overhead, and allows consistent policy enforcement across a distributed enterprise infrastructure.

A further technical effect is achieved through the ability to preserve and transmit telemetry data even when a foreign computing environment is temporarily unable to communicate externally. When a file-access event occurs in an isolated or intermittently connected environment, the embedded content of the tracer payload directs the foreign computing environment to record telemetry data locally within the tracer payload-integrated file rather than attempting an immediate transmission. As the file is subsequently transferred or reopened on a system with network connectivity, the accumulated telemetry data is automatically transmitted together with any newly generated telemetry information. This deferred-transmission mechanism ensures that telemetry corresponding to each access event is retained and ultimately delivered, enabling reconstruction of the full propagation history of the file, including intermediate accesses that occurred while the foreign computing environment was offline or was otherwise limited or restricted in its ability to generate and transmit the network communication. Conventional beacon-based systems typically discard or lose telemetry generated in restricted environments, whereas the described approach maintains continuity of forensic data, improving reliability, completeness, and analytical accuracy of post-exfiltration visibility.

Collectively, these technical effects provide a persistent, environment-agnostic mechanism for observing the handling of digital files after they leave controlled environments. By producing telemetry through pre-existing file-handling behavior and capturing network-pathway information, the described system improves the reliability, scalability, and forensic value of post-exfiltration monitoring in ways not achievable by conventional data-loss-prevention or beacon-based techniques.

FIG. 1 illustrates operational environment 100 in accordance with an implementation. Operational environment 100 is generally representative of an environment in which an exfiltration telemetry system operates. In particular, operational environment 100 illustrates an environment in which a tracer payload-integrated file is generated, subsequently exfiltrated, and network communications associated with the file and the exfiltration are processed to produce telemetry. Operational environment 100 includes client device 101, network 103, foreign computing environment 105, tracer payload-integrated file 107, file content 109, tracer payload 111, file access event 113, existing processing 115, and network communication 117. The elements of operational environment 100 are representative of hardware, software, and logical components that may be implemented in a variety of enterprise or distributed computing arrangements.

Figure 6:
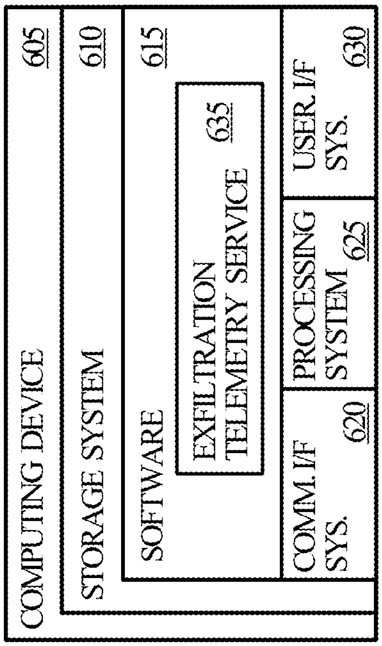
FIG. 6 illustrates a computing device used in several implementations.

Client device 101 is generally representative of a computing device, system, or service configured to generate, manage, and monitor digital files, an example of which is provided by computing device 605 of FIG. 6. Examples include a workstation, file server, enterprise gateway, or cloud-hosted application executing within a managed network. Client device 101 may execute program instructions that generate tracer payload 111 and integrate tracer payload 111 into file content 109 to produce tracer payload-integrated file 107. In some scenarios, file content 109 and tracer payload 111 refer to the same data (i.e., tracer payload is integrated into file content 109, while in other cases, file content 109 and tracer payload 111 may be distinct). Tracer payload-integrated file 107 may then be stored locally, distributed through a collaboration platform, or transmitted over network 103 to other systems.

Network 103 is generally representative of one or more communication networks through which data may be transferred between client device 101 and foreign computing environment 105. Network 103 may include enterprise networks, public networks, cloud infrastructures, or combinations thereof. Network 103 facilitates the exfiltration of tracer payload-integrated file 107 from client device 101 to foreign computing environment 105, as well as the later return of network communication 117 generated during telemetry.

Foreign computing environment 105 is generally representative of any computing system, service, or combination of processing elements that operates external to the administrative control of client device 101 or its associated enterprise. In various embodiments, foreign computing environment 105 may include one or more cloud-based collaboration platforms, external endpoints, online file hosting services, third-party communication or transfer systems, any other unmanaged computing resources, or a combination thereof. Examples of cloud-based collaboration platforms include document-sharing or productivity environments that permit real-time editing, previewing, or synchronization of files among multiple users. Examples of external endpoints include unmanaged user devices such as personal computers, mobile devices, or partner workstations that access or store files outside enterprise control. Examples of online file hosting services include web-based repositories or storage services that allow file upload, download, or preview through browser or API access. Additional examples of foreign computing environments include email gateways, external content delivery systems, automated scanning or indexing services, or any other computing resource that may handle a file as part of routine network or user activity. An example of such a computing system is provided by computing device 605 of FIG. 6. Foreign computing environment 105 obtains tracer payload-integrated file 107 through authorized distribution or unauthorized exfiltration over network 103. Once obtained, foreign computing environment 105 stores or processes tracer payload-integrated file 107 in connection with its ordinary operations.

In some embodiments, the file may be stored or transported on removable storage media, such as universal serial bus (USB) flash drives, external solid state hard drives, external hard disk drives, SD cards, optical media, or other portable storage devices. In these scenarios, the removable media itself may participate in the file access event and thereby become a source of telemetry that can be observed and correlated by the techniques described herein. When a removable medium is presented to a foreign computing environment and the medium is read (whether files are copied off the medium or merely opened and viewed directly from the medium), metadata and access artifacts associated with the removable medium can be captured or inferred by telemetry processes that observe the foreign environment's handling of the file. Such information can include device-level identifiers or fingerprints (for example manufacturer/vendor identifiers, device model, device serial number or UUID where available), filesystem metadata (for example volume label, filesystem type, capacity), mount and unmount event timestamps, file-level metadata (for example file path on the medium, file size, last-modified time, file hash), and indicators of preview or indexing activity (for example thumbnail generation or partial-content reads). The availability and granularity of these items depends on the particular foreign environment and how it processes or indexes files, but when present they provide additional attribution and context for an exfiltration event.

Tracer payload-integrated file 107 includes file content 109 and tracer payload 111. File content 109 represents the functional or informational material of the file, such as a document, image, archive, or other data object. Tracer payload 111 includes an identifier that corresponds to the associated file (here being tracer payload-integrated file 107) embedded content designed to be interpretable by ordinary file-handling routines of foreign computing environment 105. Examples of embedded content include markup directives, relationship definitions, metadata fields, script segments, or encoded network references. These elements are incorporated in a format compatible with the host file type so that they are automatically processed when the file is opened or previewed.

File access event 113 occurs when foreign computing environment 105 performs an operation that causes tracer payload-integrated file 107 to be read or rendered. Examples of file access event 113 include a user opening a file in a viewer application, an automated indexing or thumbnailing process reading file metadata, or a cloud previewer generating a visual representation of the file. During file access event 113, existing processing 115 of foreign computing environment 105 interprets file content 109 and embedded content of tracer payload 111 using its standard parsing, rendering, or metadata-extraction routines. These processing routines are pre-existing behaviors native to the operating system, viewer, or preview service and do not require any specialized plug-in, macro, or monitoring agent.

For example, file access event 113 may include opening tracer payload-integrated file 107 in a document viewer that automatically renders a markup directive referencing an external image, which causes foreign computing environment 105 to fetch the resource and transmit network communication 117. In another example, file access event 113 may occur when a cloud preview service indexes metadata of tracer payload-integrated file 107 and, through existing processing 115, performs a background network lookup or resource resolution that generates network communication 117 containing the tracer identifier and pathway attributes.

As existing processing 115 operates on tracer payload 111, the foreign computing environment 105 automatically performs actions defined by the embedded content, including telemetry operations that generate network communication 117. Network communication 117 may include a tracer identifier and network-pathway attributes associated with the transmission, such as a source address, resolver identifier, protocol data, or timestamp. Network communication 117 is transmitted over network 103 from foreign computing environment 105 to client device 101 or to a telemetry service associated with client device 101. The network communication 117 may be received by a telemetry collector or analytics component of client device 101 for storage, correlation, analysis, and the like.

Figure 2:
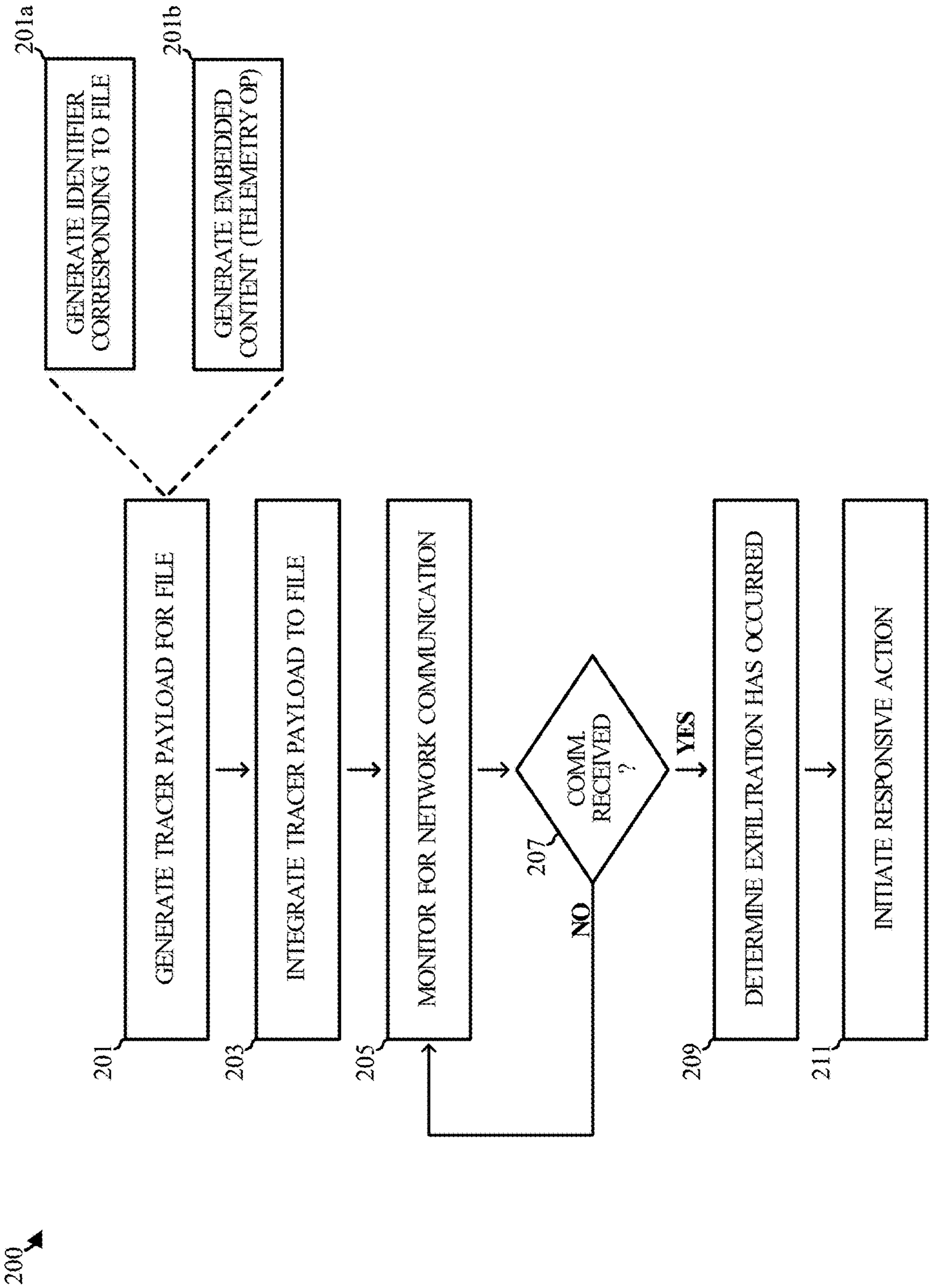
FIG. 2 illustrates a telemetry method in accordance with an implementation.

FIG. 2 illustrates telemetry method 200 in accordance with an implementation. Telemetry method 200 represents a process in which a tracer payload-integrated file may be generated, exfiltrated, and processed to produce telemetry. Telemetry method 200 may be implemented in program instructions in the context of the software and/or firmware elements of each of client device 101, foreign computing environment 105, or a combination thereof, each of FIG. 1, respectively. In various embodiments, the program instructions may be implemented by one or more local computing devices, one or more distributed computing devices, one or more remote computing devices, may be provided as a cloud service, or a combination thereof. The program instructions, when executed by one or more processing devices of one or more computing systems (e.g., computing device 705 in FIG. 7), direct the one or more computing systems to operate as follows, referring parenthetically to the steps in FIG. 3, and in the singular to a computing device for the sake of clarity.

At step 201, one or more computing devices generate a tracer payload (e.g., tracer payload 113 of FIG. 1) corresponding to a target file. The tracer payload includes data and embedded content configured to cause telemetry generation when the file is later accessed on a foreign computing environment.

At sub step 201*a*, the computing devices generate a tracer identifier uniquely associated with the file. The tracer identifier may include an alphanumeric value, a cryptographic token, or an encoded hash of file content. In some embodiments, the identifier may be generated according to a namespace or campaign grouping to allow correlation across multiple tracer payloads issued by an enterprise telemetry service.

At sub step 201*b*, the computing devices generate embedded content for inclusion in the tracer payload. Embedded content may include one or more of a markup directive, linked-object definition, metadata field, script segment, or encoded network reference. In some embodiments, multiple types of embedded content are generated and combined into a single tracer payload such that at least one variant will be interpretable by any given foreign computing environment. In other embodiments, embedded content may include integrity or authentication data, such as a digital signature or checksum, to verify payload authenticity or prevent unauthorized modification.

In some embodiments, the tracer payload may be generated by an enterprise telemetry service operating centrally within an organization. In other embodiments, individual endpoint agents deployed on enterprise-managed client devices may automatically generate tracer payloads for files created or modified on those devices. These agents may obtain identifier assignments and payload policies from the enterprise telemetry service to maintain consistency and correlation across the enterprise.

At step 203, the computing devices integrate the tracer payload into the file to produce a tracer payload-integrated file. Integration may include modifying data associated with the file, such as inserting the embedded content into document markup, metadata fields, or container relationship manifests. In some embodiments, integration may occur at a file gateway, collaboration service, or data-loss-prevention appliance configured to apply tracer payloads to outbound files. In other embodiments, integration may occur automatically within applications that generate or export files, such as productivity suites or content-management systems. The resulting tracer payload-integrated file retains the original functional content while also including embedded elements interpretable by standard file-handling routines.

At step 205, the computing devices monitor for network communications generated in response to file access events. Monitoring may be performed by a telemetry collector, an analytics engine, or a centralized enterprise service configured to receive network communications transmitted from foreign computing environments. In some embodiments, the telemetry collector continuously monitors network endpoints or listens on a designated domain or address for inbound requests containing tracer identifiers. In other embodiments, the collector may query external telemetry sources, such as DNS logs or proxy services, to identify network events associated with tracer identifiers.

At step 207, the system determines whether a network communication has been received. If no network communication associated with the tracer identifier has been detected, the system returns to step 205 and continues monitoring. If a network communication is received, the system proceeds to step 209. In some embodiments, telemetry collectors may perform rate-limiting, correlation, or deduplication when handling multiple network communications related to the same tracer identifier.

At step 209, the system determines, based on receipt of the network communication, that an exfiltration of the file has occurred. The determination may be based on the network source address, resolver identity, or other pathway attributes indicating that the tracer payload-integrated file was accessed on a foreign computing environment. In some embodiments, correlation logic may further analyze timing, geographic, or protocol data to confirm that the network communication originated outside of an authorized domain. In other embodiments, the system may classify the exfiltration by severity, policy group, or business unit based on the associated tracer identifier or issuance metadata.

At step 211, the system initiates a responsive action in response to determining that an exfiltration of the file has occurred. The responsive action may include one or more of policy enforcement, access restriction, network intervention, analytical correlation, containment, or remediation. For example, the system may generate an alert to an administrative dashboard, restrict additional file distribution, quarantine affected resources, initiate an automated remediation workflow, or update network-security rules to block further communication with the foreign computing environment.

In some embodiments, responsive actions may also include correlation across multiple tracer identifiers to identify coordinated exfiltration campaigns. In other embodiments, the analytics engine may trigger incident-response procedures or notify external systems via an application programming interface (API). In yet other embodiments, responsive actions may include updating security posture metrics or adjusting policy thresholds based on observed exfiltration frequency or source characteristics.

Figure 3A:
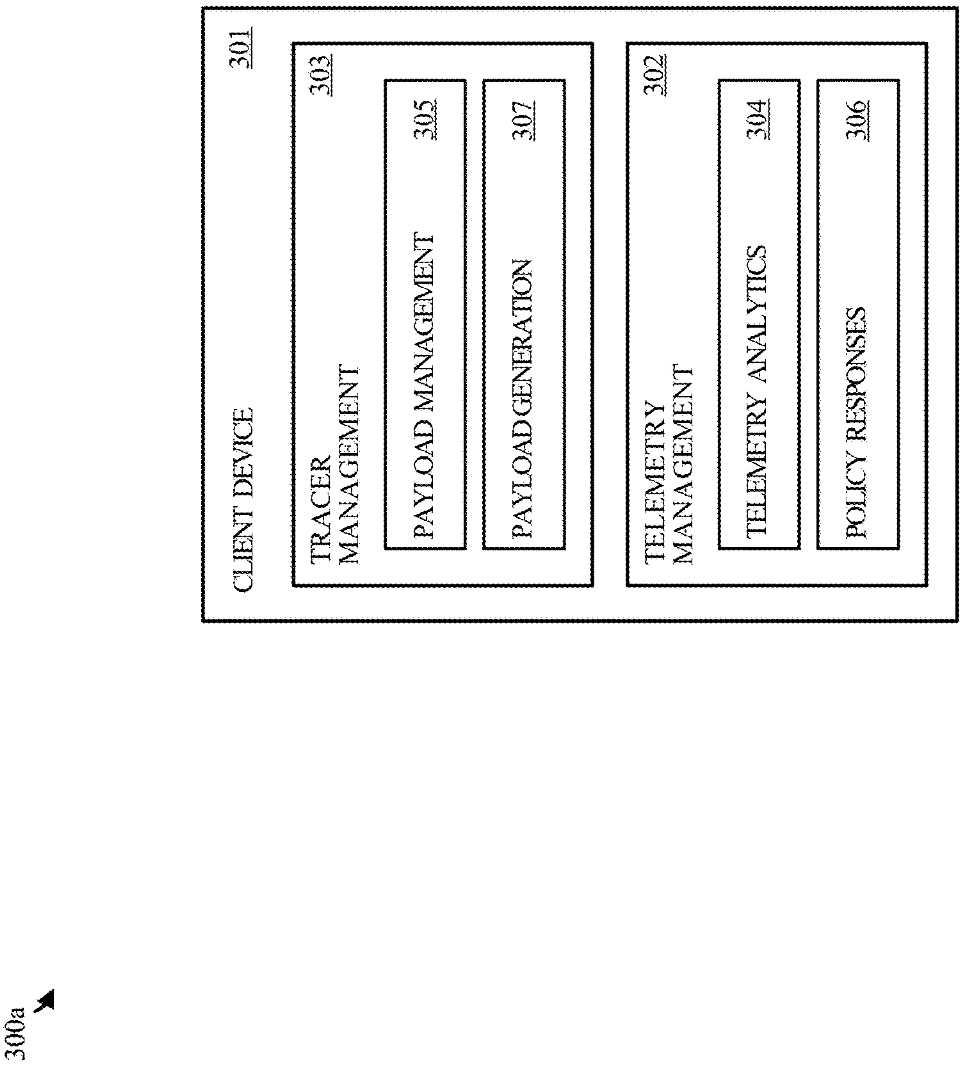
FIG. 3A illustrates a client device in detail in accordance with an implementation.
Figure 3B:
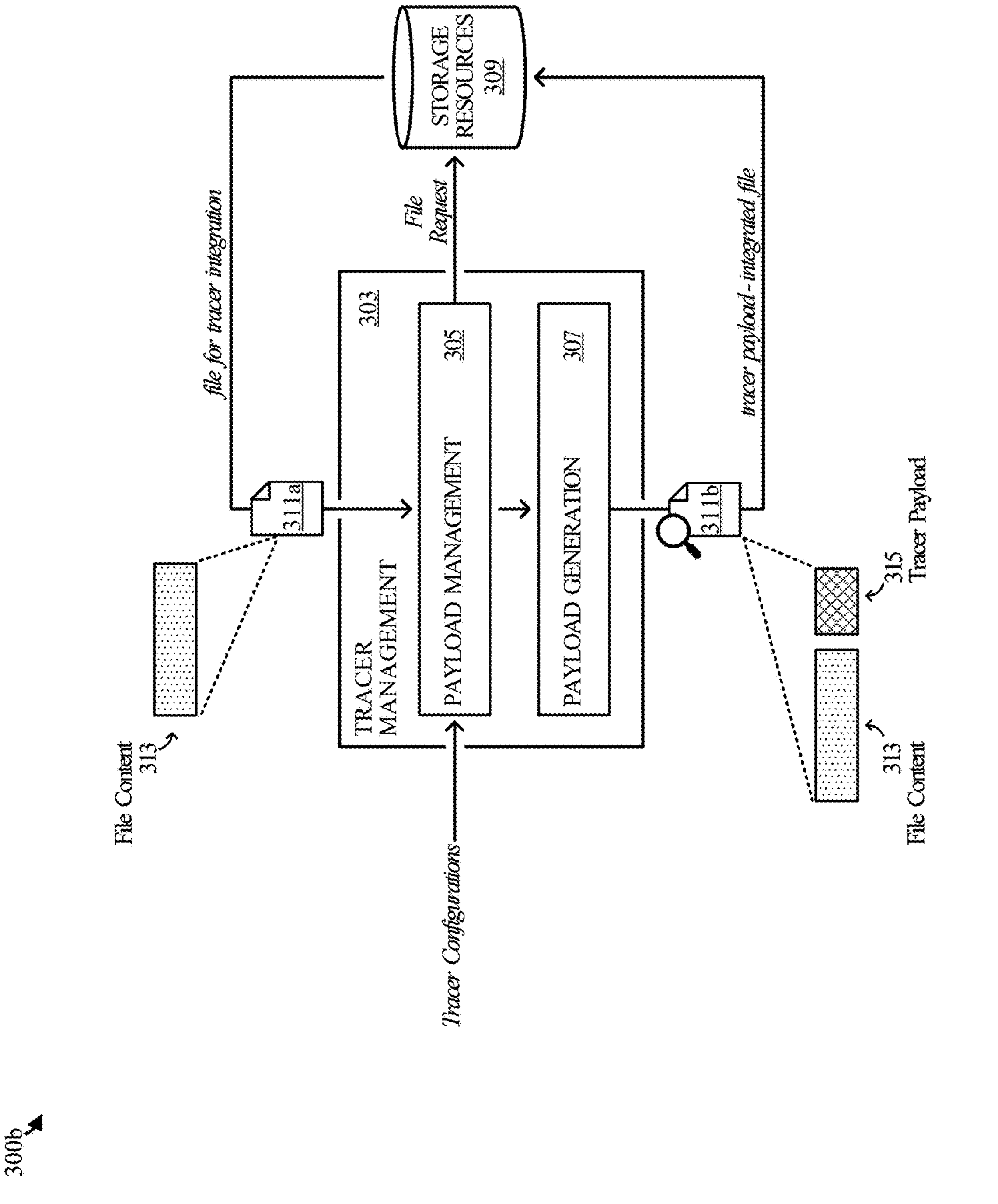
FIG. 3B illustrates an operational scenario in accordance with an implementation.
Figure 3C:
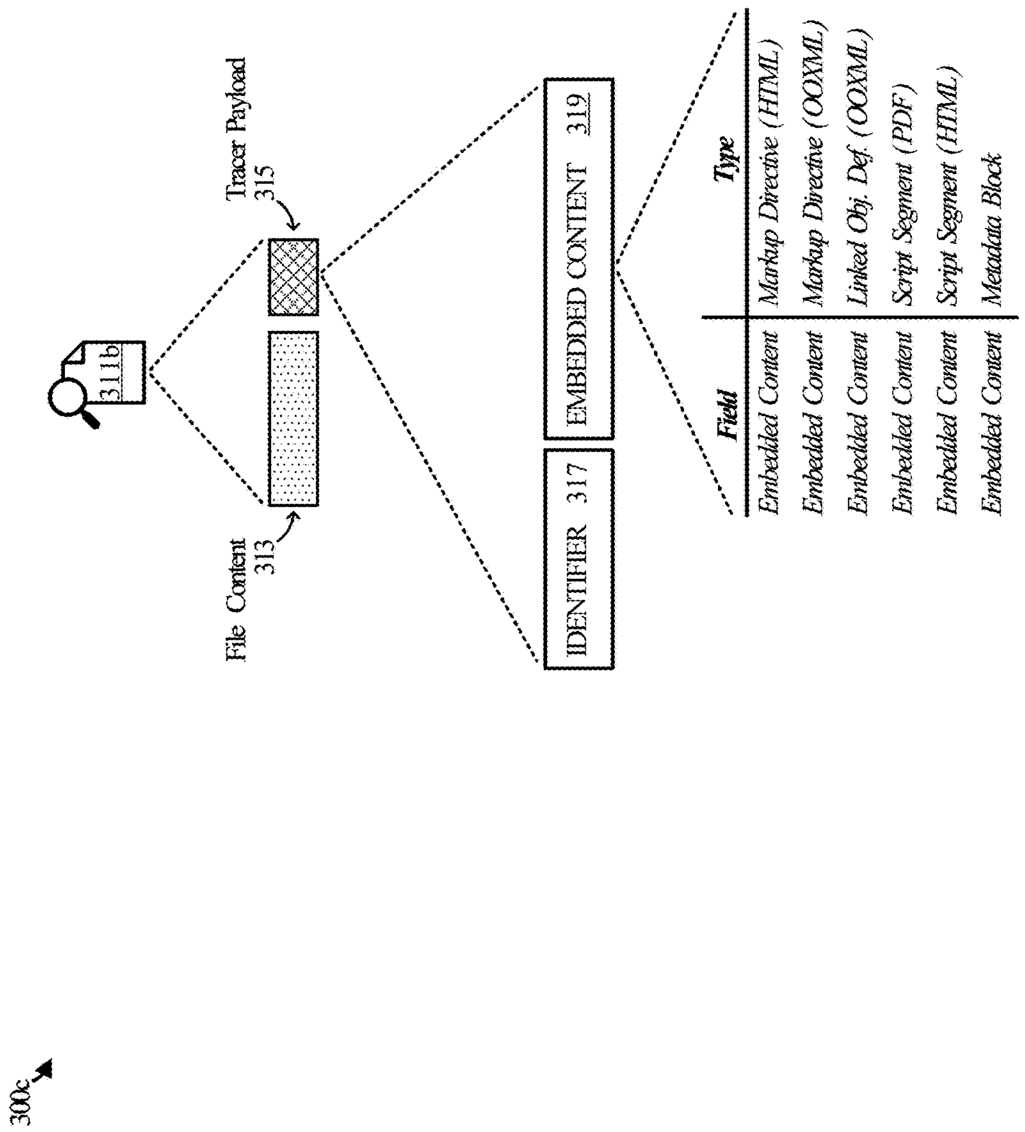
FIG. 3C illustrates an operational scenario in accordance with an implementation.
Figure 3D:
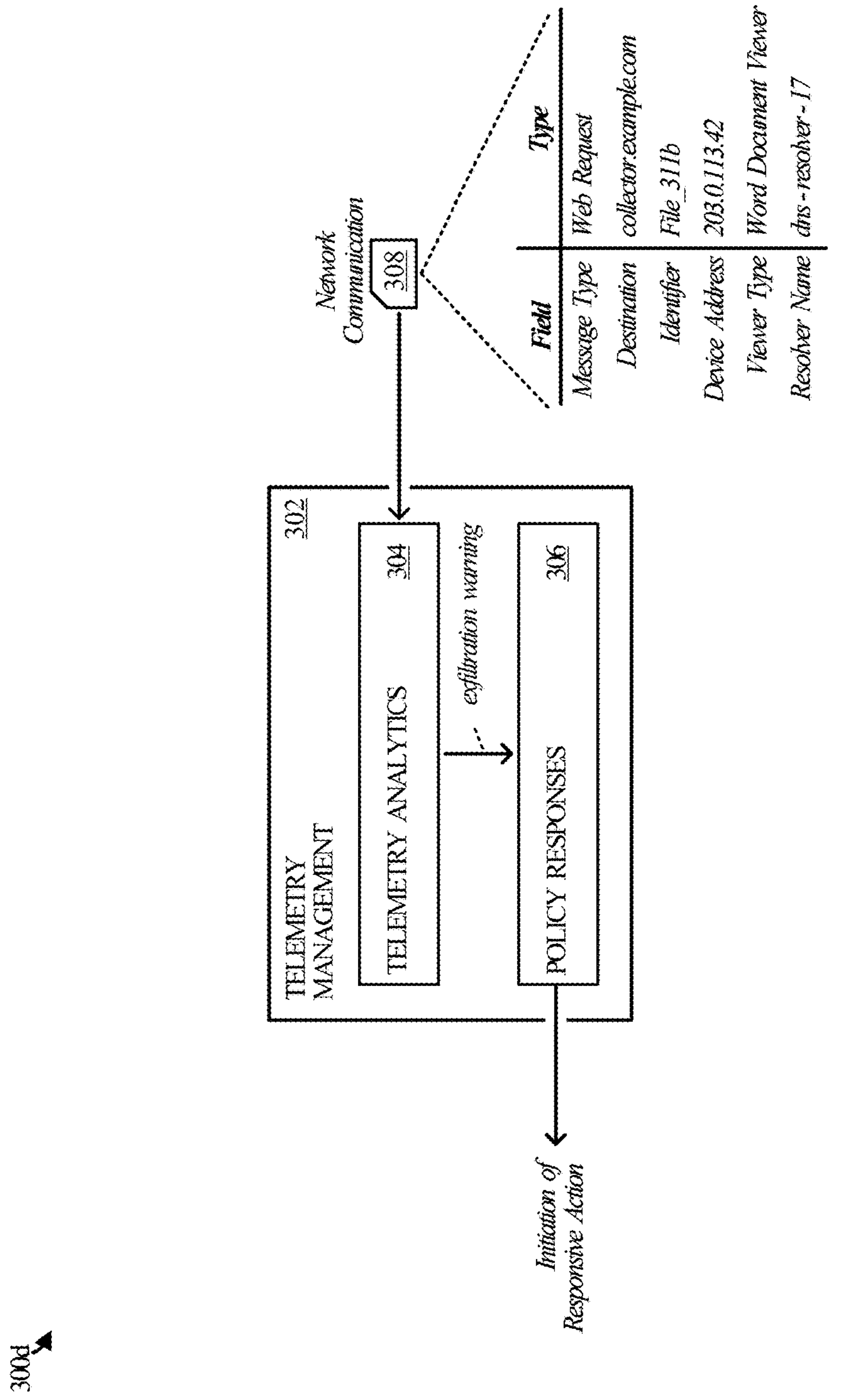
FIG. 3D illustrates an operational scenario in accordance with an implementation.
Figure 3E:
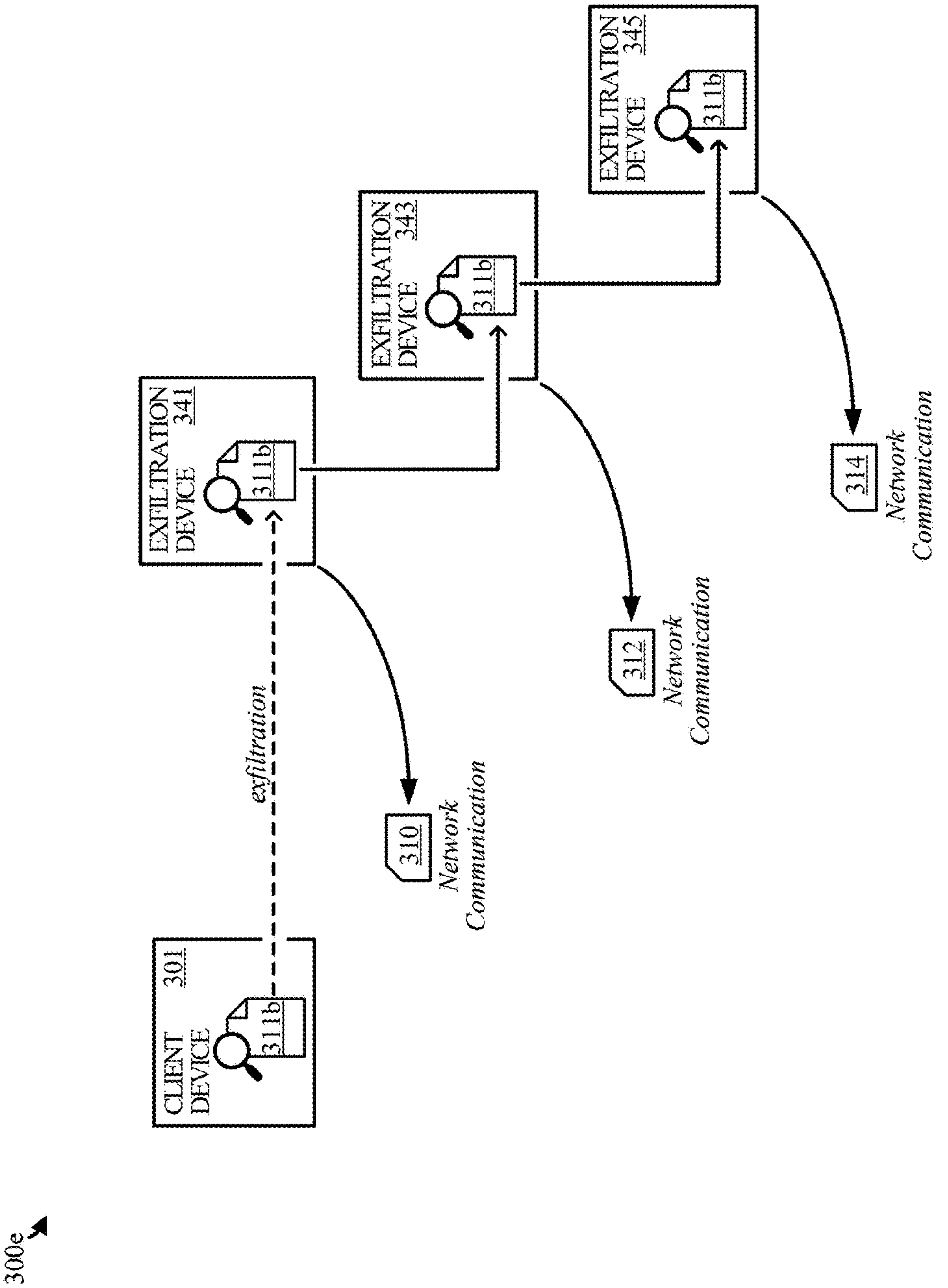
FIG. 3E illustrates an operational scenario in accordance with an implementation.
Figure 3F:
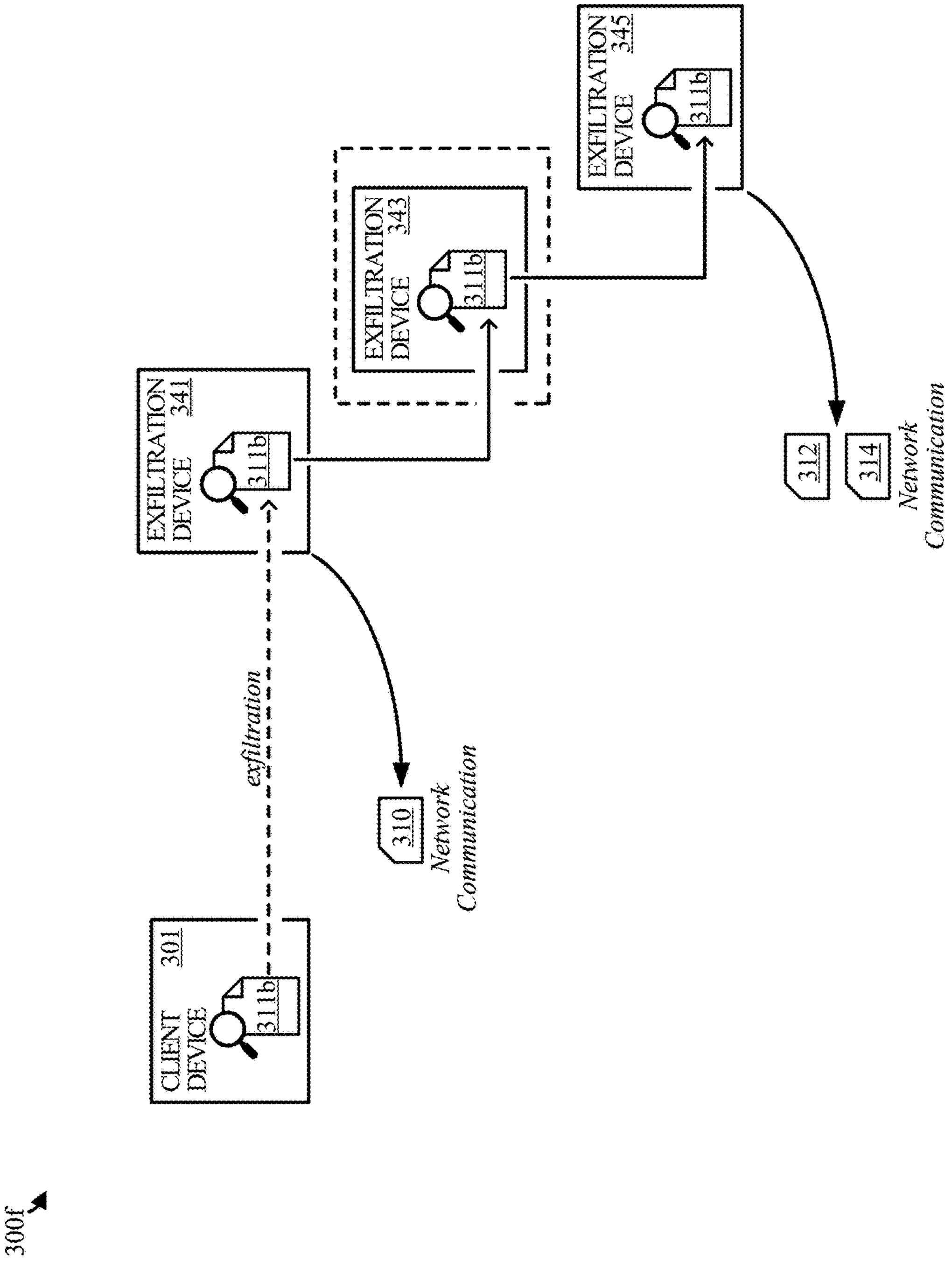
FIG. 3F illustrates an operational scenario in accordance with an implementation.

FIGS. 3A-3F illustrate example elements shown in greater detail and a corresponding series of example operational scenarios. In particular, FIG. 3A illustrates a client device in detail, FIG. 3B illustrates an operational scenario in which a tracer payload integrated file is generated, FIG. 3C illustrates an operational scenario showing details of a tracer payload-integrated file, FIG. 3D illustrates an operational scenario showing further details of a tracer payload-integrated file, FIG. 3E illustrates an operational scenario in which a network communication is received, and FIG. 3F illustrates an operational scenario in which file propagation can be determined for an exfiltrated file.

FIG. 3A illustrates client device in greater detail 300*a* in accordance with an implementation. Client device in greater detail 300*a* includes client device 301, which is generally representative of a client device, such as client device 101 of FIG. 1, shown in greater detail. Client device 301 may include other elements not shown, and in some embodiments, certain elements may be combined or integrated into other components. Client device 301 includes telemetry management 302 and tracer management 303, which may operate independently or cooperatively to perform the functions described herein.

Tracer management 303 is generally representative of hardware, software, or firmware for generating and integrating tracer payloads into digital files. Tracer management 303 may leverage payload management 305 and payload generation 307 to generate and integrate tracer payloads into digital files. Payload management 305 may include program instructions or logic configured to apply enterprise policy settings for tracer issuance, manage associations between tracer identifiers and files, and coordinate payload deployment across client devices or repositories. Payload generation 307 may include logic or program instructions configured to generate tracer identifiers, construct embedded content variants, and assemble tracer payloads for integration into target files. In some embodiments, payload generation 307 may automatically select or combine multiple types of embedded content to increase activation likelihood across diverse foreign computing environments. In other embodiments, payload generation 307 may interface with enterprise services to obtain configuration data, encryption keys, or telemetry endpoints.

Telemetry management 302 is generally representative of hardware, software, or firmware for receiving, analyzing, and managing network communications generated as telemetry. Telemetry management 302 may leverage telemetry analytics 304 and policy responses 306 to receive, analyze, and manage network communications generated as telemetry. Telemetry analytics 304 may function as a telemetry collector that receives network communications transmitted from foreign computing environments, extracts tracer identifiers and pathway attributes, and correlates telemetry events across multiple tracer payload-integrated files. Policy responses 306 may include program instructions configured to initiate responsive actions based on telemetry results, such as generating alerts, enforcing access policies, updating network configurations, or triggering containment and remediation workflows. In other embodiments, telemetry analytics 304 and policy responses 306 may be integrated into a unified service or distributed across multiple devices within an enterprise telemetry infrastructure.

Client device 301 thus provides an example computing arrangement in which tracer management 303 generates and integrates tracer payloads into files, and telemetry management 302 receives and processes resulting network communications. Together, these components enable post-exfiltration visibility, analytics, and responsive control without requiring any specialized software on the foreign computing environment.

FIG. 3B illustrates operational scenario 300*b* in accordance with an implementation. Operational scenario 300*b* includes tracer management 303 of FIG. 3A and further includes storage resources 309, file 311*a*, file content 313, file 311*b*, and tracer payload 315.

Operational scenario 300*b* is generally representative of an example in which tracer management 303 obtains, based at least in part on configurations, file 311*a* from storage resources 309, integrates a tracer payload into file 311*a* to produce file 311*b*, and stores file 311*b* back into storage resources 309. File 311*a* may represent any digital file containing file content 313, such as a document, spreadsheet, image, archive, or other data object. Tracer payload 315 may include one or more embedded-content variants, such as markup directives, linked-object definitions, metadata fields, script segments, or encoded network references, generated in accordance with an enterprise policy. File 311*b* may represent a tracer payload-integrated file that includes file content 313 and tracer payload 315 combined into a single self-contained object.

In some embodiments, tracer management 303 may retrieve file 311*a* from storage resources 309 locally, remotely, via a cloud-based file service, and the like. In other embodiments, integration of tracer payload 315 may occur during file creation, modification, or upload events managed by enterprise applications. Storage resources 309 may represent any persistent data store, including a network-attached storage device, distributed file system, database, or cloud storage bucket. After integration, file 311*b* may be made available for use, sharing, or distribution, thereby enabling subsequent telemetry generation when accessed on a foreign computing environment as described elsewhere herein.

FIG. 3C illustrates operational scenario 300*c* in accordance with an implementation. Operational scenario 300*c* is generally representative of a scenario in which file 311*b*, which is shown in greater detail, includes tracer payload 315. File 311*b*, described in FIG. 3B, is a tracer payload-integrated file and includes file content 313 and tracer payload 315. Tracer payload 315 includes identifier 317 and embedded content 319. Identifier 317 may be a unique value, token, hash, or encoded string that identifies file 311*b* or associates it with an issuance record. Embedded content 319 represents one or more data elements configured to be automatically interpreted or acted upon by normal file-handling behavior of a foreign computing environment, thereby resulting in execution of a telemetry operation when file 311*b* is accessed.

Embedded content 319 may include any combination of several types of elements, each leveraging different aspects of common file-processing behavior to ensure reliable telemetry generation. The following variants illustrate representative examples of such elements.

In some embodiments, embedded content 319 may include a markup directive referencing an external resource. A markup directive may take the form of a standard hypertext markup language (HTML), extensible markup language (XML), or other declarative element that instructs a viewer or renderer to fetch an external object. When a document viewer, browser, or preview service processes the markup, its existing rendering engine automatically performs a network request to retrieve the referenced object. That request constitutes the network communication that carries identifier 317 and pathway information. An example markup directive that may be included in embedded content 319 is shown below. The example shows a standard image reference that, when rendered by a viewer or previewer that fetches external images, results in an outbound HTTPS GET containing tracer id ABC123.

```
<img src="https://collector.example.com/
  beacon?tid=ABC123" alt=" "/>
```

Markup Directive Example

In other embodiments, embedded content 319 may include a linked-object definition within a container or relationship manifest, such as the ".rels" file in an Office Open XML package. Relationship entries specify external targets required for proper document rendering. When a compatible application opens the file, its relationship-resolver component automatically dereferences external links to verify object availability or to cache content. This dereferencing triggers a network communication to the collector endpoint, again embedding identifier 317 in the request path or query parameters. An example linked-object definition that may be included in embedded content 319 is shown below. The example illustrates an Open Office XML (OOXML) relationship that points to an external resource; compatible viewers typically resolve rels and attempt to fetch Target, producing a network request with tracer id DEF456.

```
<Relationship Id="rId5"
Type="http://schemas.openxmlformats.org/officeDocument/2006/relationships/image"
  TargetMode="External"
  Target="https://collector.example.com/
    object?tid=DEF456">
```

Linked-Object Definition Example

Embedded content 319 may also include metadata values encoded in XMP, EXIF, ID3, or other metadata formats. Many operating systems and cloud-based previewers automatically parse metadata when indexing or generating thumbnails. In some configurations, the metadata value may contain a tracer identifier or a reference to a remote schema or namespace that, when resolved, generates the telemetry event. Example metadata values that may be included in embedded content 319 is shown below. The example illustrates an XMP metadata block embedding a tracer id GHI789. Previewers, indexers, or ingestion services that parse XMP may record or act on this metadata, which can result in logging or follow-up network activity

```
x:xmpmeta xmlns:x="adobe:ns:meta/"
  <rdf:RDF xmlns:rdf="http://www.w3.org/1999/02/22-
    rdf-syntax-ns #"
    <rdf:Description rdf:about=" "
    xmlns:custom="http://example.com/ns/tracer/">
    <custom:tracerID>GHI789</custom:tracerID>
    <custom:collector URL>https://collector.example-
      .com/lookup</custom: collectorURL>
  </rdf:Description>
</rdf:RDF>
</x:xmpmeta>
```

Metadata Value Example

In some embodiments, embedded content 319 may include an executable or interpretable script segment, such as JavaScript within an interactive PDF or HTML container. When the file is opened in a viewer that supports scripting, the viewer's built-in runtime executes the script as part of its normal rendering sequence. The script may issue a standard network request or resolve an encoded hostname to initiate the telemetry operation. An example of JavaScript segment that may be included in embedded content 319 is shown below. The examples illustrates a lightweight script that issues an outbound request including tracer id JKL012. When executed by a viewer with scripting enabled, it triggers an HTTP request; many previewers sandbox/disable scripts, so this is an optional-high-value variant.

```
(function( ){
  try {
    var url="https://collector.example.com/
      track?tid=JKL012&ua="+ encode URIComponent(navigator.userAgent);
    fetch(url, {method: 'GET', keepalive: true}).catch
      (function( ) { });
  } catch(e) { }
})( );
```

JavaScript Segment Example

In another embodiment, embedded content 319 may include an encoded network reference such as a uniform resource locator (URL), a uniform resource identifier (URI), or DNS hostname that incorporates identifier 317. When any process within the foreign computing environment attempts to resolve or verify that reference, a domain name system (DNS), or hypertext transfer protocol secure (HTTPS) request is automatically generated to the collector domain. Even if other embedded content types are not executed, the encoded reference ensures at least a resolver-level signal is produced. An example of an encoded network reference segment that may be included in embedded content 319 is shown below.

Collector.GHI789.Example.Com

Encoded Network Reference Example

In some embodiments, embedded content 319 may include combinations of the foregoing variants, inserted redundantly within file 311*b*. For instance, a document may contain both a markup directive and a metadata field referencing the same identifier 317, increasing the probability that at least one variant will be acted upon by the foreign computing environment's existing processing behavior. In some embodiments, embedded content 319 contains all of the described variants and may further contain additional types of embedded content. The combination of multiple interpretable elements increases the likelihood that telemetry generation occurs regardless of viewer type, operating system, or security configuration.

In some embodiments, each variant of embedded content 319 may include unique identifiers or non-cacheable parameters to prevent suppression by intermediary caching systems and to ensure distinct telemetry generation for each issuance event. The specific syntax or placement of embedded content 319 may vary according to file type and format structure, such as markup regions, metadata blocks, or container relationship files. The examples described above are representative of compatible embedding techniques and are not limiting; other equivalent structures may be used to achieve the same result of automatic telemetry initiation through standard file-handling behavior.

FIG. 3D illustrates operational scenario 300*d* in accordance with an implementation. Operational scenario 300*d* is generally representative of an example scenario in which a network communication is received and processed by a telemetry management element. Operational scenario 300*d* includes telemetry management 302 of FIG. 3A, which includes telemetry analytics 304 and policy responses 306. Operational scenario 300*d* further includes network communication 308. The elements shown are representative of hardware, software, or logical components that may be combined, distributed, or otherwise implemented in different ways across an enterprise telemetry infrastructure.

Telemetry management 302 receives network communication 308 from a foreign computing environment that has processed a tracer payload-integrated file. Network communication 308 may include a tracer identifier, network-pathway attributes, and contextual information associated with the originating foreign computing environment. Upon receipt, telemetry analytics 304 parses network communication 308 to extract identifying data and evaluate whether the communication corresponds to a known tracer identifier. Telemetry analytics 304 may correlate multiple network communications received over time to determine whether file access events correspond to a potential exfiltration, an expected external collaboration, or an anomalous access pattern.

When telemetry analytics 304 determines that network communication 308 indicates an exfiltration event, telemetry management 302 transmits an exfiltration warning or equivalent signal to policy responses 306. Policy responses 306 may include logic, program instructions, or workflows configured to initiate one or more responsive actions. Responsive actions may include generating an alert within an administrative dashboard, logging a security incident, restricting further distribution of the associated file, or initiating containment or remediation processes. In some embodiments, policy responses 306 may communicate with other enterprise systems-such as firewalls, identity-management platforms, or data-loss-prevention tools—to enforce the responsive action automatically.

An example of network communication 308 is shown as a message including a message-type field indicating a web request, a destination field identifying the collector endpoint, and an identifier field corresponding to the tracer payload-integrated file. Additional fields may include a device-address field (for example, 203.0.113.42, which is a reserved documentation address), a viewer-type field indicating the application or service that processed the file (for example, a word-processing viewer), and a resolver-address field identifying the DNS resolver used to establish the connection. These attributes illustrate typical telemetry data that may be extracted and correlated by telemetry analytics 304 to reconstruct the origin and network pathway associated with a file-access event.

In some embodiments, telemetry analytics 304 may further enrich telemetry data with supplemental information such as geolocation, protocol metadata, or temporal correlation before forwarding it to policy responses 306 or to a centralized analytics service. In other embodiments, telemetry management 302 may operate as a distributed service, wherein telemetry analytics 304 performs initial parsing at an edge location while policy responses 306 executes centrally within an enterprise or cloud environment.

Operational scenario 300*d* thus illustrates how telemetry management 302 processes network communication 308 to detect, confirm, and respond to file-exfiltration events. By analyzing telemetry generated automatically through embedded content of tracer payload-integrated files, telemetry management 302 enables responsive security actions without requiring any instrumentation or cooperative software on the foreign computing environment.

FIG. 3E illustrates operational scenario 300*e* in accordance with an implementation. Operational scenario 300*e* is generally representative of an example scenario in which a tracer payload-integrated file is propagated across multiple exfiltration devices, resulting in multiple telemetry events that can be correlated to reconstruct a propagation history. Operational scenario 300*e* includes client device 301, exfiltration device 341, exfiltration device 343, exfiltration device 345, file 311*b*, and network communications 310, 312, and 314. Each of exfiltration device 341, 343, and 345 are representative of a computing device from within or corresponding to a foreign computing environment (e.g., foreign computing environment 103 of FIG. 1). An example of such a computing device is provided by computing device 605 of FIG. 6.

In operational scenario 300*e*, file 311*b*, previously integrated with a tracer payload as described in FIGS. 3B and 3C, is exfiltrated from client device 301 and received at exfiltration device 341. Exfiltration device 341 performs a file access event on file 311*b* that triggers processing of embedded content within the tracer payload and automatically generates network communication 310. Network communication 310 may include the tracer identifier associated with file 311*b*, network-pathway attributes corresponding to exfiltration device 341, and contextual information identifying the file-access operation or viewing application.

Following this event, exfiltration device 341 transmits file 311*b* to exfiltration device 343. Exfiltration device 343 similarly performs a file access event when handling file 311*b*, which results in generation of network communication 312. The contents of network communication 312 may include a tracer identifier identical to that of network communication 310, thereby allowing telemetry analytics to correlate both events as successive file accesses in the same propagation sequence. Exfiltration device 343 subsequently transmits file 311*b* to exfiltration device 345, which performs another file access event that produces network communication 314. Each of network communications 310, 312, and 314 may be independently received by telemetry management 302 and processed as separate telemetry events associated with the same tracer identifier.

By analyzing tracer identifiers and network-pathway attributes from network communications 310, 312, and 314, telemetry analytics (e.g., telemetry analytics 304 of FIG. 3A) can reconstruct a propagation history for file 311*b*, including the sequence and network domains of exfiltration devices 341, 343, and 345. In some embodiments, the telemetry analytics component may determine temporal order, identify intermediate transfer systems, or detect whether the file has been accessed by unauthorized users. In other embodiments, correlation of telemetry across multiple exfiltration devices may enable detection of lateral movement, file redistribution, or cascading exfiltration behavior across interconnected networks.

FIG. 3F illustrates operational scenario **300*f* in accordance with an implementation. Operational scenario 300*f* is generally representative of an example scenario in which network communication generated in response to a file-access event is temporarily withheld due to network isolation or transmission limitations. Operational scenario 300*f* includes client device 301, exfiltration devices 341, 343, and 345, file 311*b*, and network communications 310, 312, and 314, as described in FIG. 3**E.

In operational scenario **300*f*, file 311*b* is exfiltrated from client device 301 and received at exfiltration device 341. Exfiltration device 341 performs a file-access event that causes processing of the embedded content of the tracer payload, resulting in automatic generation and transmission of network communication 310 to the telemetry collector. File 311*b* is subsequently transferred to exfiltration device 343. Exfiltration device 343 performs a file-access event that would normally trigger generation and transmission of network communication 312; however, exfiltration device 343** is located within an isolated network or otherwise lacks connectivity required for external communication. Examples of such conditions include air-gapped networks, devices with temporarily disabled network interfaces, systems operating behind outbound firewalls or proxies that restrict the applicable protocol, or environments in which external resource resolution is blocked.

Although exfiltration device 343 cannot transmit network communication 312, its normal file-handling behavior still executes the embedded content of the tracer payload. As a result, telemetry data corresponding to the file-access event is generated locally and stored within a temporary cache or metadata structure associated with file **311*b*. In some embodiments, this cached telemetry data may be recorded in an extended attribute, auxiliary data stream, or container segment of file 311*b***, effectively embedding the untransmitted network communication within the file itself.

For example, in a Windows-based foreign computing environment, telemetry data corresponding to a file access event for file **311*b* may be written to a local log file or cache within a user profile directory, such as an AppData subfolder, where it remains until the foreign computing device can generate and transmit the corresponding network communication. When the tracer payload executes during a file open, preview, or indexing operation, telemetry describing the access event, such as timestamps, process identifiers, device or user identifiers, and file hashes, may be recorded to a temporary storage object in an application-specific or system-managed directory such as AppData\Local, AppData\Roaming, or a temporary directory. The cached telemetry may include information such as access path, hostname, process name, and any queued network parameters. While performing these actions, the foreign computing device is still operating according to its conventional file-handling processes, and once outbound communication becomes available, the embedded content directs the computing device to retrieve and serialize the telemetry for transmission to the client system. In some cases, the cached telemetry information is subsequently provided to the exfiltration telemetry system as part of the telemetry operation triggered by a subsequent file access event for file 311*b***.

When file **311*b* is subsequently transmitted to exfiltration device 345, the cached copy of file 311*b*, which contains telemetry data corresponding to untransmitted network communication 312, is included in the transfer. Exfiltration device 345 performs its own file-access event, causing both its current telemetry information and the previously cached telemetry from exfiltration device 343 to be transmitted as part of network communication 314. Network communication 314** therefore includes cumulative telemetry data reflecting file access by multiple exfiltration devices, enabling the telemetry analytics system to reconstruct the propagation history even for periods in which intermediate devices lacked network connectivity.

In some embodiments, the tracer payload may be configured to retain a limited buffer of telemetry data within file **311*b*, appending new telemetry information to existing data each time the file is accessed or transmitted. In other embodiments, the cached telemetry may be stored separately in the foreign computing environment and later re-associated with the file when communication becomes available. In either case, operational scenario 300*f* illustrates a resilient telemetry approach in which network communication data is preserved and transmitted opportunistically, ensuring that the lifetime of file 311*b*** can be reconstructed even across isolated or intermittently connected environments.

Figure 4:
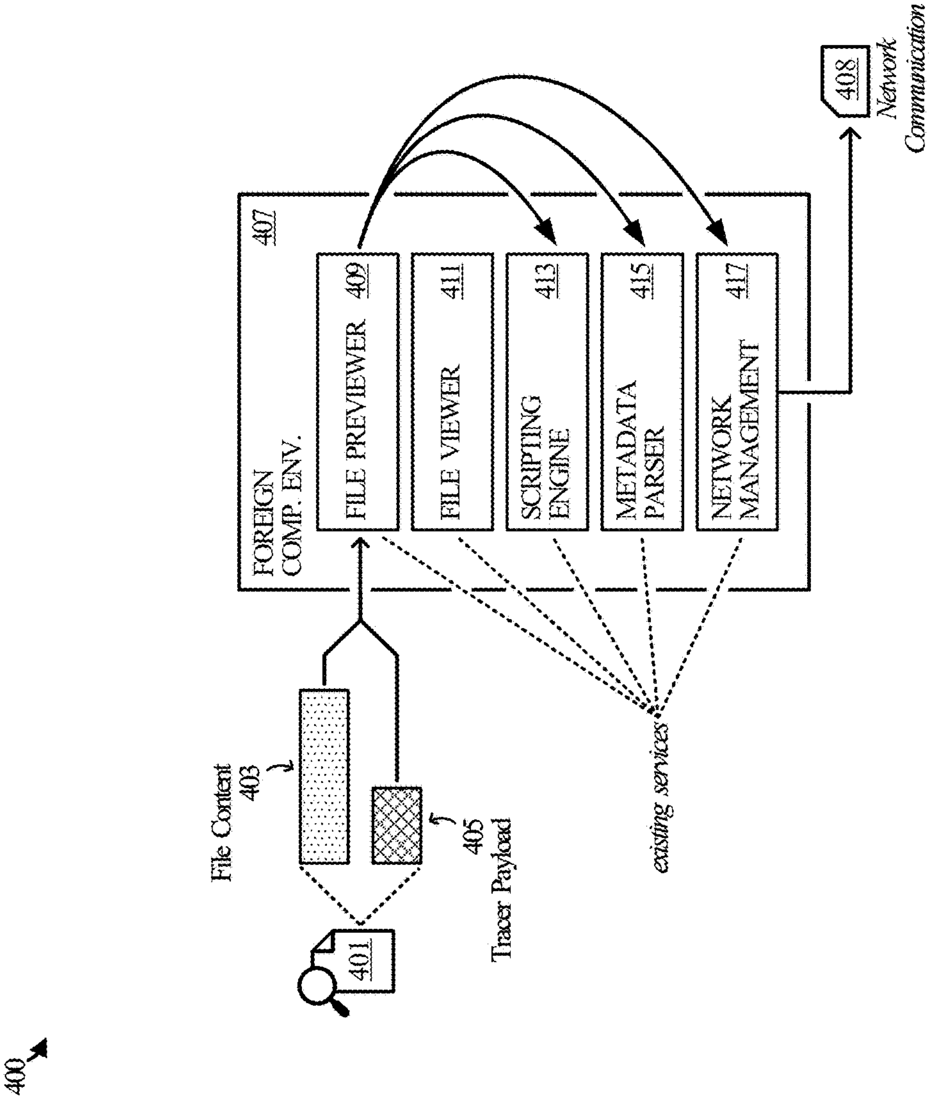
FIG. 4 illustrates an operational sequence in accordance with an implementation.

FIG. 4 illustrates operational scenario 400 in accordance with an implementation. Operational scenario 400 is generally representative of a scenario in which a foreign computing device has exfiltrated a file and processes the file in accordance with existing functionality of the foreign computing environment. Operational scenario 400 includes file 401, file content 403, tracer payload 405, foreign computing environment 407, file previewer 409, file viewer 411, scripting engine 413, metadata parser 415, and network management 417.

File 401 represents a tracer payload-integrated file that includes file content 403 and tracer payload 405. File content 403 may include the ordinary functional or informational material of the file, while tracer payload 405 includes embedded content structured to cause execution of a telemetry operation when processed by normal file-handling behavior. Foreign computing environment 407 represents any computing system external to administrative control of the originating enterprise. Foreign computing environment 407 includes a collection of pre-existing modules and services that perform standard file-processing operations, including file previewer 409, file viewer 411, scripting engine 413, metadata parser 415, and network management 417. In other scenarios, foreign computing environment 407 may include more or fewer elements in different combinations.

In the example shown, foreign computing environment 407 obtains file 401, which is initially processed by file previewer 409. File previewer 409 performs operations such as rendering or generating thumbnails of file content 403 and, in doing so, encounters embedded content of tracer payload 405. File previewer 409 may leverage other modules of foreign computing environment 407 as needed to act in accordance with the embedded content, such as invoking scripting engine 413 to execute a script segment or invoking metadata parser 415 to interpret metadata fields embedded within file 401. Network management 417, which represents existing networking functionality of foreign computing environment 407, then performs standard resource-resolution or transmission operations in response to the embedded content, producing network communication 408 directed to a telemetry collector or associated service.

In other scenarios, another module of foreign computing environment 407, such as file viewer 411, metadata parser 415, or scripting engine 413, may first process file 401 and may then leverage any combination of the other modules to complete file-handling operations. For instance, file viewer 411 may render markup directives that cause a network fetch through network management 417, or metadata parser 415 may resolve a linked resource defined within tracer payload 405. Regardless of the order or combination of components involved, each module operates according to the standard file-viewing and processing behavior of foreign computing environment 407, requiring no specialized modification or cooperative software to execute the embedded content of tracer payload 405.

Figure 5:
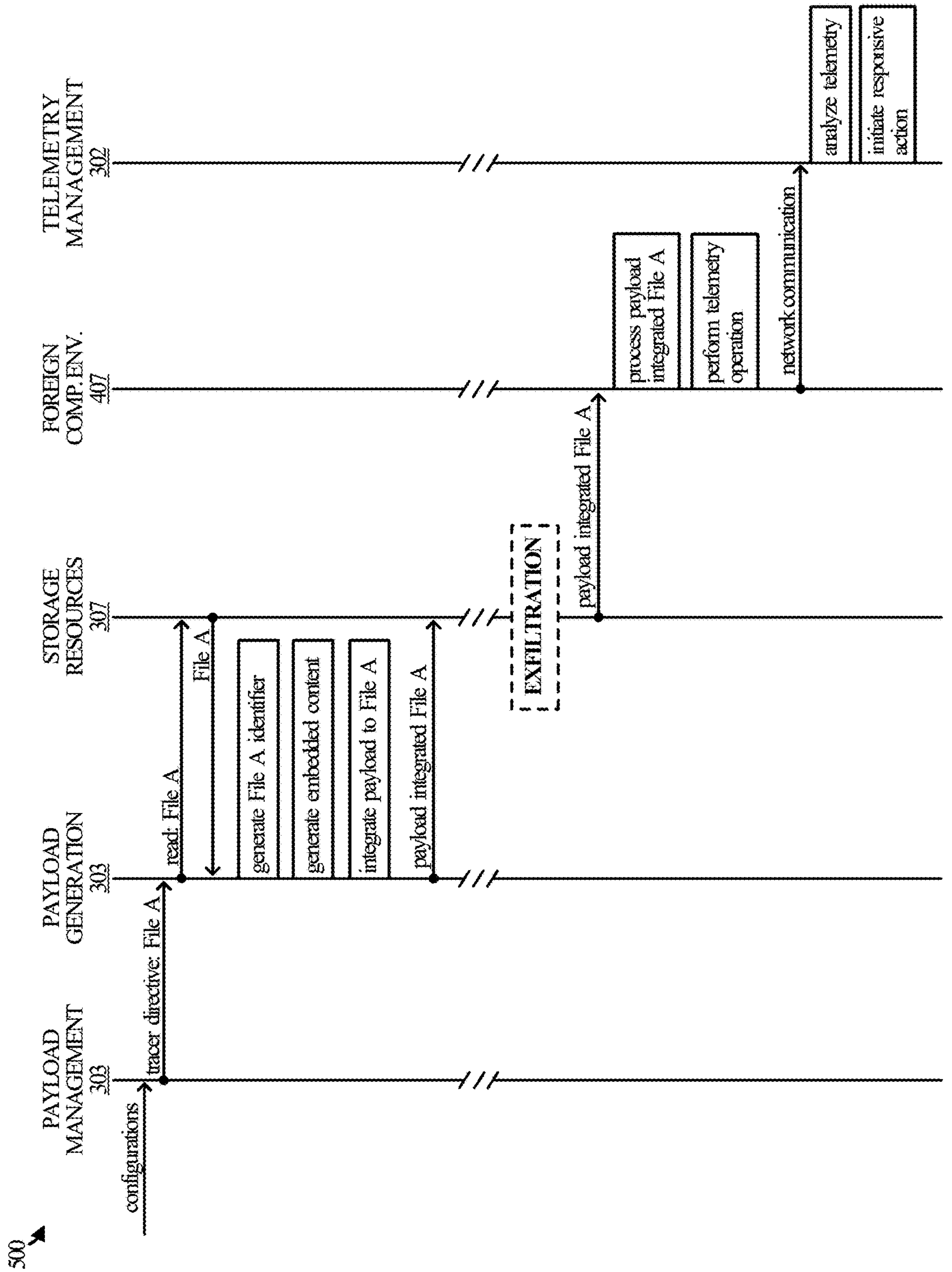
FIG. 5 illustrates an operational sequence in accordance with an implementation.

FIG. 5 illustrates operational sequence 500 in accordance with an implementation. Operational sequence 500 is generally representative of an example software flow in which a tracer payload is generated, integrated into a file, and later produces telemetry when accessed by a foreign computing environment. Operational sequence 500 includes payload management 305, payload generation 307, storage resources 309, telemetry management 302, each of FIG. 3, and foreign computing environment 407 of FIG. 4. The elements of operational sequence 500 represent functional software components that may execute on the same or different computing devices within an enterprise environment.

Payload management 305 receives configuration data establishing policies that define which files are eligible for tracer integration. The configuration may specify file types, data-classification rules, or sensitivity thresholds. For example, a policy may identify files containing personally identifiable information, such as employee records or customer-contact data, as candidates for tracer payload integration. Based on the configuration, payload management 305 determines that a particular file (File A) is subject to tracing and communicates a tracer directive for File A to payload generation 307. In some scenarios, an agentic machine learning model is leveraged to scan through files and identify where a file satisfies a given tracer policy and is therefore a candidate for tracer integration.

Payload generation 307 retrieves File A from storage resources 309 and generates a tracer payload comprising an identifier corresponding to File A and embedded content configured to cause telemetry generation. The embedded content may include multiple variants, such as markup directives, relationship definitions, metadata fields, script segments, or encoded network references. Payload generation 307 integrates the identifier and embedded content into File A to produce a tracer-payload-integrated file. The resulting file retains the original functional content of File A while also including the embedded content of the tracer payload. The integrated file is then returned to storage resources 309 for continued use or distribution.

At a later time, an exfiltration event occurs at storage resources 309, resulting in the tracer-payload-integrated File A being obtained by foreign computing environment 407. Foreign computing environment 407 performs a file-access event on the integrated file. During normal processing, one or more existing components of foreign computing environment 407—such as file previewers, viewers, scripting engines, or metadata parsers-automatically process the embedded content of File A in accordance with the environment's standard file-handling behavior. This automatic processing causes the telemetry operation to execute, resulting in the generation of a network communication transmitted from foreign computing environment 407 to telemetry management 302.

Telemetry management 302 receives the network communication, analyzes telemetry attributes such as tracer identifiers, source addresses, resolver identifiers, and viewer type, and determines that the communication corresponds to an exfiltration event. Telemetry management 302 then initiates a responsive action in accordance with enterprise policy. Responsive actions may include generating an administrative alert, enforcing access restrictions, initiating containment procedures, or updating network-security configurations to mitigate further data loss.

FIG. 6 illustrates computing device 605, which represents any system or collection of systems in which the various applications, processes, services, and scenarios disclosed herein may be implemented. Examples of the computing apparatus illustrated by computing device 605 include but are not limited to, server computers, web servers, cloud computing platforms, and data center equipment, as well as any other type of physical or virtual server machine, container, and any variation or combination thereof. (In some examples, computing device 605 may also be representative of desktop and laptop computers, tablet computers, and the like.)

Computing device 605 may be implemented as a single apparatus, system, or device or may be implemented in a distributed manner as multiple apparatuses, systems, or devices. Computing device 605 includes but is not limited to, processing system 625, storage system 610, software 615, communication interface system 620, and user interface system 630. Processing system 625 is operatively coupled with storage system 610, communication interface system 620, and user interface system 630.

Processing system 625 loads and executes software 615 from storage system 610. Software 615 includes and implements exfiltration telemetry 635, which is representative of the processes discussed with respect to the preceding Figures. When executed by processing system 625, software 615 directs processing system 625 to operate as described herein for at least the various processes, operational scenarios, and sequences discussed in the foregoing implementations. Computing device 605 may optionally include additional devices, features, or functionality not discussed for purposes of brevity.

Referring still to FIG. 6, processing system 625 may include a micro-processor and other circuitry that retrieves and executes software 615 from storage system 610. Processing system 625 may be implemented within a single processing device but may also be distributed across multiple processing devices or sub-systems that cooperate in executing program instructions. Examples of processing system 625 include general-purpose central processing units, microcontroller units, graphical processing units, application-specific processors, integrated circuits, application-specific integrated circuits, and logic devices, as well as any other type of processing device, combinations, or variations thereof.

Storage system 610 may comprise any computer-readable storage media readable by processing system 625 and capable of storing software 615. Storage system 610 may include volatile and nonvolatile, removable, and non-removable media implemented in any method or technology for storage of information, such as computer-readable instructions, data structures, program modules, or other data. Examples of storage media include random access memory, read-only memory, magnetic disks, optical disks, flash memory, virtual memory and non-virtual memory, magnetic cassettes, magnetic tape, magnetic disk storage, other magnetic storage devices, or any other suitable storage media. In no case is the computer-readable storage media a propagated signal. Storage system 610 may be implemented as a single storage device but may also be implemented across multiple storage devices or sub-systems co-located or distributed relative to each other. Storage system 610 may comprise additional elements, such as a controller, capable of communicating with processing system 625 or possibly other systems.

Software 615 (including exfiltration telemetry 635) may be implemented in program instructions and among other functions may, when executed by processing system 625, direct processing system 625 to operate as described with respect to the various operational scenarios, sequences, and processes illustrated herein. Exfiltration telemetry 635 is generally representative of example processes in accordance with the techniques described herein.

In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single-threaded environment or multi-threaded, or in accordance with any other suitable execution paradigm, variation, or combination thereof. Software 615 may include additional processes, programs, or components, such as operating system software, virtualization software, or other application software. Software 615 may also comprise firmware or some other form of machine-readable processing instructions executable by processing system 625.

In general, software 615, when loaded into processing system 625 and executed, transforms a suitable apparatus, system, or device (of which computing device 605 is representative) overall from a general-purpose computing system into a special-purpose computing system customized to support processes as described herein. Indeed, encoding software 615 on storage system 610 may transform the physical structure of storage system 610. The specific transformation of the physical structure may depend on various factors in different implementations of this description. Examples of such factors may include, but are not limited to, the technology used to implement the storage media of storage system 610 and whether the computer-storage media are characterized as primary or secondary storage, as well as other factors.

For example, if the computer-readable storage media are implemented as semiconductor-based memory, software 615 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 620 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well-known and need not be discussed at length here.

Communication between computing device 605 and other computing systems (not shown) may occur over a communication network or networks and in accordance with various communication protocols, combinations of protocols, or variations thereof. Examples include intranets, internets, the Internet, local area networks, wide area networks, wireless networks, wired networks, virtual networks, software-defined networks, data center buses, and backplanes, or any other type of network, a combination of network, or a variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above but only by the claims and their equivalents.

What is claimed is:

1. A computer-implemented method, comprising:

generating, by one or more computing devices, a tracer payload for a file, wherein:

the tracer payload comprises an identifier corresponding to the file and embedded content configured to cause a foreign computing environment to automatically perform a telemetry operation when a file access event is performed on a tracer payload-integrated file by the foreign computing environment, wherein the embedded content comprises multiple types of embedded content, and wherein each of the multiple types of embedded content can independently cause the foreign computing environment to automatically perform the telemetry operation, the embedded content is configured such that, when the foreign computing environment performs the file access event on the tracer payload-integrated file, one or more of the multiple types of embedded content are automatically processed by native file handling routines of the foreign computing environment, to automatically perform the telemetry operation, the one or more of the multiple types of embedded content cause, in response to automatic processing by the native file handling routines, the foreign computing environment to at least automatically generate a network communication from the foreign computing environment to the one or more computing devices, and the network communication comprises the identifier, host characteristics of the foreign computing environment, and attributes of a network pathway used by the foreign computing environment to transmit the network communication to the one or more computing devices; and integrating, by the one or more computing devices, the tracer payload into data of the file to produce the tracer payload-integrated file.

2. The computer-implemented method of claim 1, further comprising:

determining, by the one or more computing devices in response to receiving the network communication, that an exfiltration of the file has occurred.

3. The computer-implemented method of claim 2, further comprising:

initiating, by the one or more computing devices in response to determining the exfiltration of the file has occurred, a responsive action.

4. The computer-implemented method of claim 3, wherein initiating the responsive action comprises enforcing a data-protection policy, restricting, or revoking access to the file, modifying network routing or firewall behavior, performing an analytical correlation or audit process, containing a potentially compromised system, or executing a remediation procedure.

5. The computer-implemented method of claim 1, wherein:

the multiple types of embedded content comprises a markup directive, resource reference, linked-object definition, script segment, metadata field, or a combination thereof.

6. The computer-implemented method of claim 1, wherein:

the native file handling routines comprise processing via a rendering engine of the foreign computing environment, processing via a preview generator of the foreign computing environment, processing via a metadata-extractor of the foreign computing environment, processing via a linked-object resolver, processing via an indexing service of the foreign computing environment, or a combination thereof, when the one or more of the multiple types of embedded content are automatically processed by the native file handling routines, the one or more of the multiple types of embedded content directs the foreign computing environment to generate the network communication without additional input or software.

7. The computer-implemented method of claim 1, wherein the network communication comprises an HTTP request, an HTTPS request, a DNS query, a DNS-over-HTTPS query, or a combination thereof.

8. The computer-implemented method of claim 1, wherein the host characteristics of the foreign computing environment comprise a public Internet Protocol address, a user-agent string, a resolver identifier, a media access control (MAC) address, geographic information, or a combination thereof.

9. The computer-implemented method of claim 1, wherein each of the multiple types of embedded content of the tracer payload are structured such that, when the foreign computing environment performs the telemetry operation, the foreign computing environment attempts the telemetry operation using multiple network-communication protocols and queues telemetry data until network connectivity is available.

10. The computer-implemented method of claim 1, further comprising correlating, by the one or more computing devices, multiple network communications received from different foreign computing environments to reconstruct a propagation history of the file, wherein each of the multiple network communications comprise the identifier.

11. The computer-implemented method of claim 1, wherein:

processing of any of the multiple types of embedded content by the foreign computing environment further causes telemetry data corresponding to the file access event to be recorded within the tracer payload-integrated file, and each subsequent transmission of the tracer payload-integrated file includes the telemetry data and any previously recorded telemetry data.

12. One or more non-transitory computer-readable storage media having program instructions stored thereon that, when read and executed by one or more processors of a computing apparatus, direct the computing apparatus to at least:

generate a tracer payload for a file, wherein:

the tracer payload comprises an identifier corresponding to the file and embedded content configured to cause a foreign computing environment to automatically perform a telemetry operation when a file access event is performed on a tracer payload-integrated file by the foreign computing environment, wherein the embedded content comprises multiple types of embedded content, and wherein each of the multiple types of embedded content can independently cause the foreign computing environment to automatically perform the telemetry operation, the embedded content is configured such that, when the foreign computing environment performs the file access event on the tracer payload-integrated file, one or more of the multiple types of embedded content are automatically processed by native file handling routines of the foreign computing environment, to automatically perform the telemetry operation, the one or more of the multiple types of embedded content cause, in response to automatic processing by the native file handling routines, the foreign computing environment to at least automatically generate a network communication from the foreign computing environment to the computing apparatus, and the network communication comprises the identifier, host characteristics of the foreign computing environment, and attributes of a network pathway used by the foreign computing environment to transmit the network communication to the computing apparatus;

integrate the tracer payload into data of the file to produce the tracer payload-integrated file;

determine, in response to receiving the network communication, that an exfiltration of the file has occurred; and initiate, in response to determining the exfiltration of the file has occurred, a responsive action.

13. The one or more non-transitory computer-readable storage media of claim 12, wherein the program instructions directing the computing apparatus to initiate the responsive action further comprises instructions that, when executed by the one or more processors, direct the computing apparatus to:

enforce a data-protection policy, restrict, or revoke access to the file, modify network routing or firewall behavior, perform an analytical correlation or audit process, contain a potentially compromised system, or execute a remediation procedure.

14. The one or more non-transitory computer-readable storage media of claim 12, wherein:

the multiple types of embedded content comprises a markup directive, resource reference, linked-object definition, script segment, metadata field, or a combination thereof.

15. The one or more non-transitory computer-readable storage media of claim 12, wherein:

the native file handling routines comprise processing via a rendering engine of the foreign computing environment, processing via a preview generator of the foreign computing environment, processing via a metadata-extractor of the foreign computing environment, processing via a linked-object resolver, processing via an indexing service of the foreign computing environment, or a combination thereof, when the one or more of the multiple types of embedded content are automatically processed by the native file handling routines, the one or more of the embedded content directs the foreign computing environment to generate the network communication without additional input or software.

16. The one or more non-transitory computer-readable storage media of claim 12, wherein:

the network communication comprises an HTTP request, an HTTPS request, a DNS query, a DNS-over-HTTPS query, or a combination thereof, and the host characteristics of the foreign computing environment comprise a public Internet Protocol address, a user-agent string, a resolver identifier, a media access control (MAC) address, geographic information, or a combination thereof.

17. The one or more non-transitory computer-readable storage media of claim 12, wherein each of the multiple types of embedded content of the tracer payload are structured such that, when the foreign computing environment is caused to perform the telemetry operation, the foreign computing environment is caused to attempt the telemetry operation using multiple network-communication protocols and queues telemetry data until network connectivity is available.

18. The one or more non-transitory computer-readable storage media of claim 12, wherein the program instructions further comprises instructions that, when executed by the one or more processors, direct the computing apparatus to:

correlate multiple network communications received from different foreign computing environments to reconstruct a propagation history of the file, wherein each of the multiple network communications comprise the identifier.

19. The one or more non-transitory computer-readable storage media of claim 12, wherein:

when the foreign computing device environment is caused to process any of the multiple types of embedded content, the foreign computing device environment is further caused to record telemetry data corresponding to the file access event within the tracer payload-integrated file, and each subsequent transmission of the tracer payload-integrated file includes the telemetry data and any previously recorded telemetry data.

20. A computing device comprising:

one or more computer-readable storage media;

one or more processors operatively coupled with the one or more computer-readable storage media; and program instructions stored on the one or more computer-readable storage media that, when read and executed by the one or more processors, direct the computing device to at least:

generate a tracer payload for a file, wherein:

the tracer payload comprises an identifier corresponding to the file and embedded content configured to cause a foreign computing environment to automatically perform a telemetry operation when a file access event is performed on a tracer payload-integrated file by the foreign computing environment, wherein the embedded content comprises multiple types of embedded content, and wherein each of the multiple types of embedded content can independently cause the foreign computing environment to automatically perform the telemetry operation;

the embedded content is configured such that, when the foreign computing environment performs the file access event on the tracer payload-integrated file, one or more of the multiple types of embedded content are automatically processed by native file handling routines of the foreign computing environment;

to automatically perform the telemetry operation, the one or more of the multiple types of embedded content cause, in response to automatic processing by the native file handling routines, the foreign computing environment to at least automatically generate a network communication from the foreign computing environment to the one or more computing devices; and the network communication comprises the identifier, host characteristics of the foreign computing environment, and attributes of a network pathway used by the foreign computing environment to transmit the network communication to the one or more computing devices, integrate the tracer payload into data of the file to produce the tracer payload-integrated file, determine, in response to the network communication, that an exfiltration of the file has occurred, and initiate, in response to the exfiltration of the file, a responsive action.

* * * * *